Dec. 7, 1926. 1,609,384
J. M. SIERRA
MANUFACTURE OF MILK POWDER
Filed March 13, 1923  2 Sheets-Sheet 1

Dec. 7, 1926.

J. M. SIERRA

MANUFACTURE OF MILK POWDER

Filed March 13, 1923  2 Sheets-Sheet 2

1,609,384

Patented Dec. 7, 1926.

1,609,384

UNITED STATES PATENT OFFICE.

JOSE MANUEL SIERRA, OF SOUTHALL, ENGLAND.

MANUFACTURE OF MILK POWDER.

Application filed March 13, 1923, Serial No. 624,811, and in Great Britain March 27, 1922.

This invention relates to the manufacture of milk powder and has reference particularly to the evaporation of the milk and the collection of the powder.

The object of the invention is to provide a complete and convenient equipment which can be operated continuously and wherein there will be intimate mixture of the various grades of milk particles and the primary feature of the invention consists in the provision of hoppers into which a large proportion of the powder passes directly and the rest is deposited therein from time to time from filter bags and is thus in intimate mixture with the powder deposited directly.

Apparatus in accordance with our invention is illustrated in the accompanying drawings wherein:—

Referring to these drawings wherein like numerals of reference indicate corresponding parts wherever occurring throughout all the figures the numeral 1 designates a drying chamber from which collecting hoppers 2 depend and of which the walls are plain on their inner surfaces. The lower ends of these hoppers being adapted to have collecting sacks or bins connected to them, and some form of shutter or air-lock device may be provided so that the hoppers can be opened to the sacks or bins from time to time without permitting the entrance of air or dust from outside.

Figure 1:
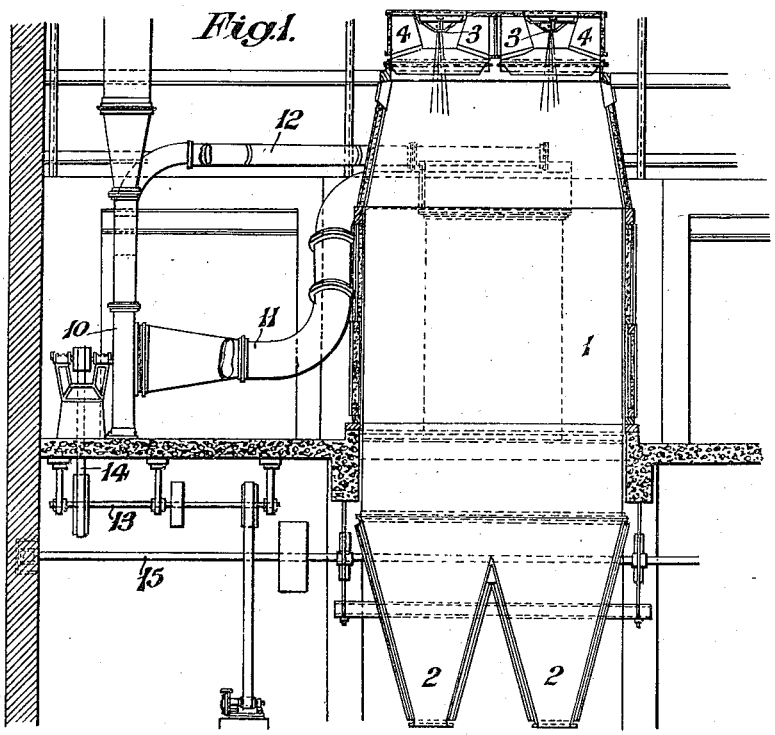
Fig. 1 is a sectional elevation taken through the drying chamber and its associated mechanism.

At the upper end of the drying chamber atomizing nozzles 3 are arrange and these nozzles are surrounded by annular chambers 4 adapted to be supplied with hot air from the pipe 5 shown in Fig. 1 for the purpose of maintaining the drying chamber at the desired temperature and the drying chamber may be lagged to prevent undue radiation losses. The air supplied through the pipe 5 is preferably filtered by passage through a washer indicated at 5ª, and after being heated, preferably by passage through a steam jacketed pipe or a chamber supplied with heating pipes or coils such as 5ᵇ, to the desired temperature, passes to the annular chambers 4 as will be clear upon reference particularly to Fig. 1.

The milk to be atomized is blown in through the atomizing nozzles 3 by means of steam in well known manner and the milk may be condensed and some of its moisture removed prior to this operation also in known manner.

Figure 2:
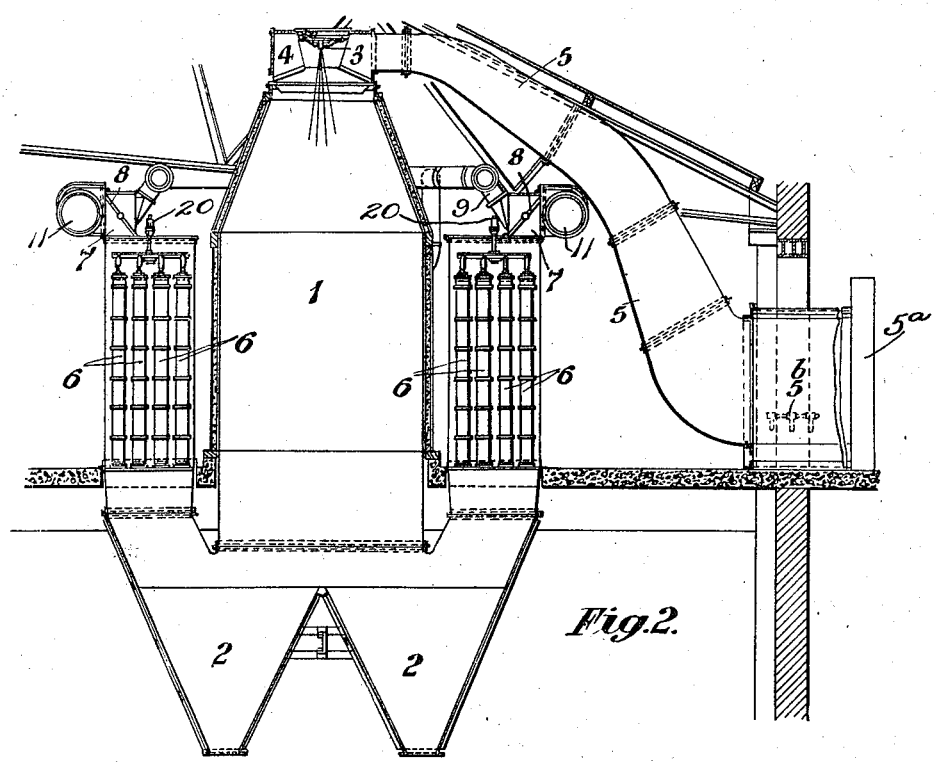
Fig. 2 is a similar view the section being taken at right angles to Fig. 1.
Figure 3:
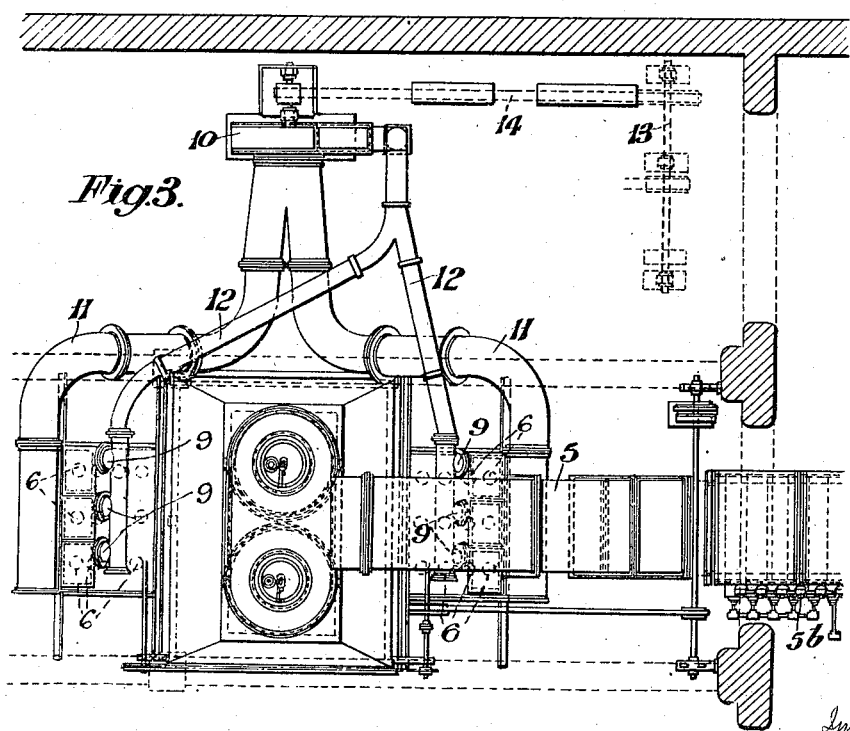
Fig. 3 is a plan view of the apparatus.

In communication with the hopper 2 and drying chambers 1 inverted filter bags 6 are provided and these are preferably enclosed in a casing as seen best in Fig. 2 and each of these batteries is open to a suction or vacuum chamber 7 and each of these chambers 7 is provided with a valve 8 so that it can be shut off from the vacuum system when desired for the purpose of enabling the bags to be shaken by shaking mechanism 20. Moreover the arrangement is preferably such that when a battery of filter bags is shut off from the vacuum system it is opened up to a pressure system which may be constituted by a branch pipe such as 9 leading from the delivery side of the pump or fan which produces the vacuum, or air under pressure supplied from some other position on the plant may be utilized for this purpose. The arrangement adapted in the present example, is best illustrated in Fig. 3 in which the numeral 10 indicates a centrifugal pump which creates a vacuum in the pipes 11 which are in communication with the vacuum chambers 7 and the delivery pipe of this pump 10 has branch pipes 12 which connect up to the pipes 9 which as before mentioned blow into the chambers 7 when the appropriate valve is adjusted to the alternative position thereby reversing the circuit of the air through the filter bags. The pump 10 may be driven from a counter shaft 13 by means of a belt 14 passing over pulleys as clearly indicated in Fig. 3 the drive being taken from a main shaft 15 which also serves through another series of bolts and pulleys to drive the shaking mechanism 20 for the bag filters but if desirable the pump 10 may be directly coupled to a prime mover such as an electric motor.

The mechanism 20 for shaking the filter bags may be of any known kind operated at predetermined intervals and the timing mechanism will be such as to ensure synchronous operation of the appropriate valve 8 prior to or simultaneously with the shaking operation so that there will be a reversing of pressure in relation to the particular battery of filter bags being shaken. A convenient arrangement is to arrange the filters in groups as indicated in the drawings each group being shaken say one a minute.

The operation of the apparatus is as follows. The atomized milk passes into the drying chamber 1 and descends through it. By the time it reaches the lower end of the drying chamber it is dried and the bulk of the milk powder is deposited directly into the collecting hoppers 2 and the residue which is in suspension in the air passes upwardly into the filter bags or screens 6 and is collected on the inner surfaces of these screens or bags and from time to time the vacuum is cut off from a filter bag or set of bags and the bags are shaken so that the powder passes down from them into the hoppers and can be removed from time to time in the usual manner.

An advantage of this invention is that the filter bags are in connection with the hoppers into which the bulk of the milk powder is directly deposited and as a consequence the product from the filters mixes automatically with the direct deposit and no subsequent mixing is required as would be the case if the product from the filter bags was collected separately as there is a difference in grading between the directly deposited powder and that which remains in suspension in the air until after it has been filtered. It will therefore be seen that we have by our invention provided an apparatus which can operate continuously and in which the minimum filtering is necessary the bulk of the product being obtained by direct deposit, only the finer particles which remain in suspension in the air being passed to the filters.

Although we have described our invention as applied to the manufacture of milk powder it will be obvious that it could be adapted for other uses where it is required to separate off and dry a solid constituent from a liquid constituent.

What I claim and desire to secure by Letters Patent is:—

1. Apparatus for the manufacture of milk powder, comprising a vertical drying chamber open at its lower end and of which the walls are plain on their inner surfaces, a steam operated downwardly directed spraying nozzle through which the milk is sprayed located in the top of said drying chamber, means for admitting heated air to the top of the drying chamber, and causing it to flow in a downward direction, means for heating and drying the air before admission to the drying chamber, a series of vertical filter bags open at their lower ends, means for applying air suction and pressure alternately to the exterior of the filter bags, a collecting hopper for the milk powder located beneath said drying chamber and said filter bags, so that the powdered milk falling from them simultaneously with that coming directly through the drying chamber from the sprayer will fall directly into and intermix in the hopper.

2. Apparatus for the manufacture of milk powder comprising a vertical drying chamber open at its lower end and having plain inner surfaces, a downwardly directed steam jet operated milk spraying nozzle located in the top of the drying chamber, an annular hot air admitting chamber for causing air to be admitted evenly around the milk spray at the top of the drying chamber, a series of inverted filter bags, means for applying air suction and pressure alternately to the outer surface of the filter bags, a powdered milk collecting hopper located beneath the drying chamber and the filter bags, the spraying nozzle being arranged to discharge downwards through the center of a downward supply of hot air passing through the vertical drying chamber and admitted through the annular hot air admitting chamber, the series of filter bags being arranged as batteries at opposite sides of the drying chamber and in open communication therewith at the lower ends and so that their contents will intermix in the hopper with the contents falling directly from the drying chamber.

3. Apparatus for the manufacture of milk powder, comprising a vertical drying chamber open at its lower end and provided at the top with a section tapering upwards and inwards to a central opening, a steam jet operated downwardly directed milk spraying nozzle located in the top of said drying chamber, an annular hot air admitting chamber surrounding said nozzle, a series of inverted filter bags arranged as batteries at opposite sides of the drying chamber, means for applying air suction and pressure alternately to the outer surface of the filter bags, a powdered milk collecting hopper located beneath said drying chamber and said filter bags so that the discharges from the filter bags will intermix automatically in the hopper with the contents falling directly from the drying chamber.

4. Apparatus for the manufacture of milk powder, comprising a vertical drying chamber open at its lower end and having plain inner surfaces, a milk spraying nozzle located centrally at the top of the drying chamber, means for admitting heated air to the drying chamber and causing it to flow therethrough, means for drying and heating the air before admission to the drying chamber, a battery of vertical filter bags open at their lower ends and provided with shaking devices, means for applying air suction and pressure alternately to the exterior of the bags, a collecting hopper located beneath the drying chamber and the filter bags, having a number of outlets for the milk powder, the arrangement being such that the milk shaken from the bags and that coming directly through the drying chamber from the sprayer will simultaneously fall directly into and intermix in the hopper before passing through the outlets.

5. Apparatus for the manufacture of milk powder comprising a vertical drying chamber open at its lower end and having plain inner surfaces, a steam jet operated milk spraying nozzle located in the top of the drying chamber, an annular hot air admitting chamber surrounding said nozzle, a series of inverted filter bags provided with shaking devices, a valve for admitting air suction and pressure alternately to the outer surface of the filter bags, a powdered milk collecting hopper, the spraying nozzle being arranged to discharge downwards through the center of a downward supply of hot air passing through the vertical drying chamber and admitted through the annular hot air admitting chamber, the series of filter bags being arranged in batteries at opposite sides of the drying chamber and in open communication therewith at the lower ends and so that their contents shaken into the hopper will intermix therein with the contents falling directly from the drying chamber.

6. Apparatus for the manufacture of milk powder comprising a vertical drying chamber having plain inner surfaces, a steam operated downward directed milk spraying nozzle located in the top of said drying chamber, an annular air admission chamber surrounding said spraying nozzle through which an annular stream of hot air is delivered downwardly into said drying chamber, filter bags flanking said drying chamber, means for subjecting said filter bags to suction or pressure, means for shaking said filter bags, and a collecting hopper beneath said drying chamber and said filter bags into which the dried milk powder falls both from the drying chamber and the filter bags substantially as specified.

7. Apparatus for the manufacture of milk powder comprising a vertical drying chamber having plain inner surfaces, a steam operated downward directed milk spraying nozzle located in the top of said drying chamber, an annular air admission chamber surrounding said spraying nozzle through which an annular stream of hot air is delivered downwardly into said drying chamber, means for drying and heating the air before admission to the drying chamber, batteries of filter chambers on opposite sides of said drying chamber, filter bags located within said filter chambers, a fan, connecting pipes leading from the suction and pressure sides of the fan to the filter chambers, a valve for alternatively connecting the filter chambers to either the pressure or suction sides of the fan, and a collecting hopper, filter bags flanking said drying chamber, means for subjecting said filter bags to suction and pressure alternately, means for shaking said filter bags and a collecting hopper beneath said drying chamber and said filter bags into which the dried milk powder falls both from the drying chamber and the filter bags substantially as specified.

8. Apparatus for the manufacture of milk powder comprising a vertical drying chamber open at its lower end and provided at the top with a section tapering upwards and inwards to a central opening, a steam jet operated downwardly directed milk spraying nozzle located in the top of said drying chamber, an annular hot air admitting chamber surrounding said nozzle, a series of inverted filter bags arranged as batteries at opposite sides of the drying chamber, means for applying air suction and pressure alternately to the outer surface of all the filter bags, in any particular battery at will, a powdered milk collecting hopper located beneath said drying chamber and said filter bags, so that the discharges from the filter bags will intermix automatically in the hopper with the contents falling directly from the drying chamber.

9. Apparatus for the manufacture of milk powder comprising a vertical drying chamber open at its lower end having plain inner surfaces, a steam jet operated milk spraying nozzle located in the top of the drying chamber, an annular hot air admitting chamber surrounding said nozzle, a series of inverted filter bags provided with shaking devices, valves for admitting air suction and pressure alternately to the outer surface of the filter bags, a powdered milk collecting hopper, the spraying nozzle being arranged to discharge downwards through the center of a downward supply of hot air passing through the vertical drying chamber and admitted through the annular hot air admitting chamber, the series of filter bags being arranged in batteries at opposite sides of the drying chamber and in open communication therewith at the lower ends and so that their contents shaken into the hopper will intermix therein with the contents falling directly from the drying chamber and each battery of filter bags provided independently with one of the valves for admitting air suction and pressure alternately to the outer surfaces of all the filter bags in that battery.

10. Apparatus for the manufacture of milk powder comprising a vertical drying chamber having plain inner surfaces, a steam operated downward directed milk spraying nozzle located in the top of said drying chamber, an annular air admission chamber surrounding said spraying nozzle through which an annular stream of hot air is delivered downwardly into said drying chamber, means for drying and heating the air before admission to the drying chamber, batteries of filter chambers on opposite sides of said drying chamber, filter bags located within said filter chambers, a fan, connecting pipes leading from the suction and pressure sides of the fan to the filter chambers, through each battery separately, a valve for alternatively connecting the filter chambers to either the pressure or suction sides of the fan, and a collecting hopper, filter bags flanking said drying chamber, means for subjecting all the said filter bags in any particular battery at will to suction and pressure alternately, means for shaking said filter bags and a collecting hopper beneath said drying chamber and said filter bags into which the dried milk powder falls both from the drying chamber and the filter bags substantially as specified.

11. Apparatus for the manufacture of milk powder, comprising a vertical drying chamber open at its lower end and having plain inner surfaces, a downwardly directed steam jet operated milk spraying nozzle located in the top of the drying chamber, an annular hot air admitting chamber for causing air to be admitted evenly around the milk spray at the top of the drying chamber, a series of inverted filter bags and air circulating circuit through the filter bags and means for reversing such circuit, a powdered milk collecting hopper located beneath the drying chamber and the filter bags, and spraying nozzle being arranged to discharge downwards through the center of a downward supply of hot air passing through the vertical drying chamber and admitted through the annular hot air admitting chamber, the series of filter bags being arranged as batteries at opposite sides of the drying chamber and in open communication therewith at the lower ends and so that their contents will intermix in the hopper with the contents falling directly from the drying chamber.

12. Apparatus for the manufacture of milk powder comprising a vertical drying chamber open at its lower end and provided at the top with a section tapering upwards and inwards to a central opening, a steam jet operated downwardly directed milk spraying nozzle located in the top of said drying chamber, an annular hot air admitting chamber surrounding said nozzle, a series of inverted filter bags arranged as batteries at opposite sides of the drying chamber, an air circulating circuit through each battery of filter bags and means for reversing such circuit, a powdered milk collecting hopper located beneath said drying chamber and said filter bags, so that the discharges from the filter bags will intermix automatically in the hopper with the contents falling directly from the drying chamber.

13. Apparatus for the manufacture of milk powder, comprising a vertical drying chamber open at its lower end and having plain inner surfaces, a milk spraying nozzle located centrally at the top of the drying chamber, means for admitting heated air to the drying chamber and causing it to flow therethrough, means for drying and heating the air before admission to the drying chamber, a battery of vertical filter bags open at their lower ends and provided with shaking devices, means for circulating air through the bags and means for reversing such circuit, a collecting hopper located beneath the drying chamber and the filter bags, having a number of outlets for the milk powder, the arrangement being such that the milk shaken from the bags and that coming directly through the drying chamber from the sprayer will simultaneously fall directly into and intermix in the hopper before passing through the outlets.

In witness whereof I affix my signature.

JOSE MANUEL SIERRA.